US008026630B2

(12) United States Patent
Broesse et al.

(10) Patent No.: US 8,026,630 B2
(45) Date of Patent: Sep. 27, 2011

(54) SYSTEM AND METHOD FOR SUPPLYING VOLTAGE TO ELECTRICAL LOADS OF A MOTOR VEHICLE BY USING A SUPERCAP

(75) Inventors: Andreas Broesse, Munich (DE); Dieter Polenov, Munich (DE); Hartmut Proebstle, Augsburg (DE); Markus Fuchs, Munich (DE); Michael Roesler, Pullach (DE); Maximilian Schmidl, Pullach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 81 days.

(21) Appl. No.: 12/364,778

(22) Filed: Feb. 3, 2009

(65) Prior Publication Data

US 2009/0273236 A1 Nov. 5, 2009

Related U.S. Application Data

(63) Continuation of application No. PCT/EP2007/006692, filed on Jul. 28, 2007.

(30) Foreign Application Priority Data

Aug. 4, 2006 (DE) .......................... 10 2006 036 424

(51) Int. Cl.
*B60L 1/00* (2006.01)
(52) U.S. Cl. ........................................................ 307/9.1
(58) Field of Classification Search .................... 307/9.1
See application file for complete search history.

(56) References Cited

U.S. PATENT DOCUMENTS

| 5,818,115 A * | 10/1998 | Nagao ............................. 290/31 |
| 5,880,951 A | 3/1999 | Inaba |
| 6,066,936 A * | 5/2000 | Okamura et al. ............. 320/104 |
| 6,973,393 B2 * | 12/2005 | Hasuka et al. ................... 702/63 |

(Continued)

FOREIGN PATENT DOCUMENTS

DE 197 20 816 A1 11/1998

(Continued)

OTHER PUBLICATIONS

German Search Report dated Feb. 28, 2007 with English translation (Nine (9) pages).

(Continued)

*Primary Examiner* — Rexford Barnie
*Assistant Examiner* — Dru M Parries
(74) *Attorney, Agent, or Firm* — Crowell & Moring LLP

(57) ABSTRACT

A system and method for supplying voltage to electrical loads in the onboard electrical system of a motor vehicle are provided. The onboard electrical system consists of at least two onboard electrical system regions. The first onboard electrical system region has an electric generator, a vehicle battery, as well as one or more first electrical loads. The second onboard electrical system region has a double-layer capacitor or a so-called supercap and one or more second electrical loads. Between the two onboard electrical system regions, a blocking device is provided, in particular, a semiconductor diode or a power switch, which permits a current flow from the first onboard electrical system region into the second electrical system region and largely prevents a reverse current flow from the second onboard electrical system region into the first onboard electrical system region. The output voltage of the electric generator is raised and the supercap is charged when a first threshold value of the electric voltage in the second onboard electrical system region is undershot.

9 Claims, 3 Drawing Sheets

U.S. PATENT DOCUMENTS

| | | |
|---|---|---|
| 2002/0140405 A1 | 10/2002 | Malik |
| 2004/0119337 A1 | 6/2004 | Ketteler |
| 2007/0170896 A1 | 7/2007 | Proebstle et al. |

FOREIGN PATENT DOCUMENTS

| | | |
|---|---|---|
| DE | 101 49 111 A1 | 4/2003 |
| DE | 102 59 879 A1 | 7/2004 |
| DE | 103 42 178 A1 | 4/2005 |
| DE | 10 2004 052 977 A1 | 5/2006 |
| DE | 10 2006 002 985 | 8/2007 |
| EP | 1 013 506 A2 | 6/2000 |
| EP | 1 247 979 A2 | 10/2002 |
| EP | 1 405 767 A1 | 4/2004 |

OTHER PUBLICATIONS

International Search Report dated Dec. 13, 2007 with English translation (Six (6) pages).

* cited by examiner

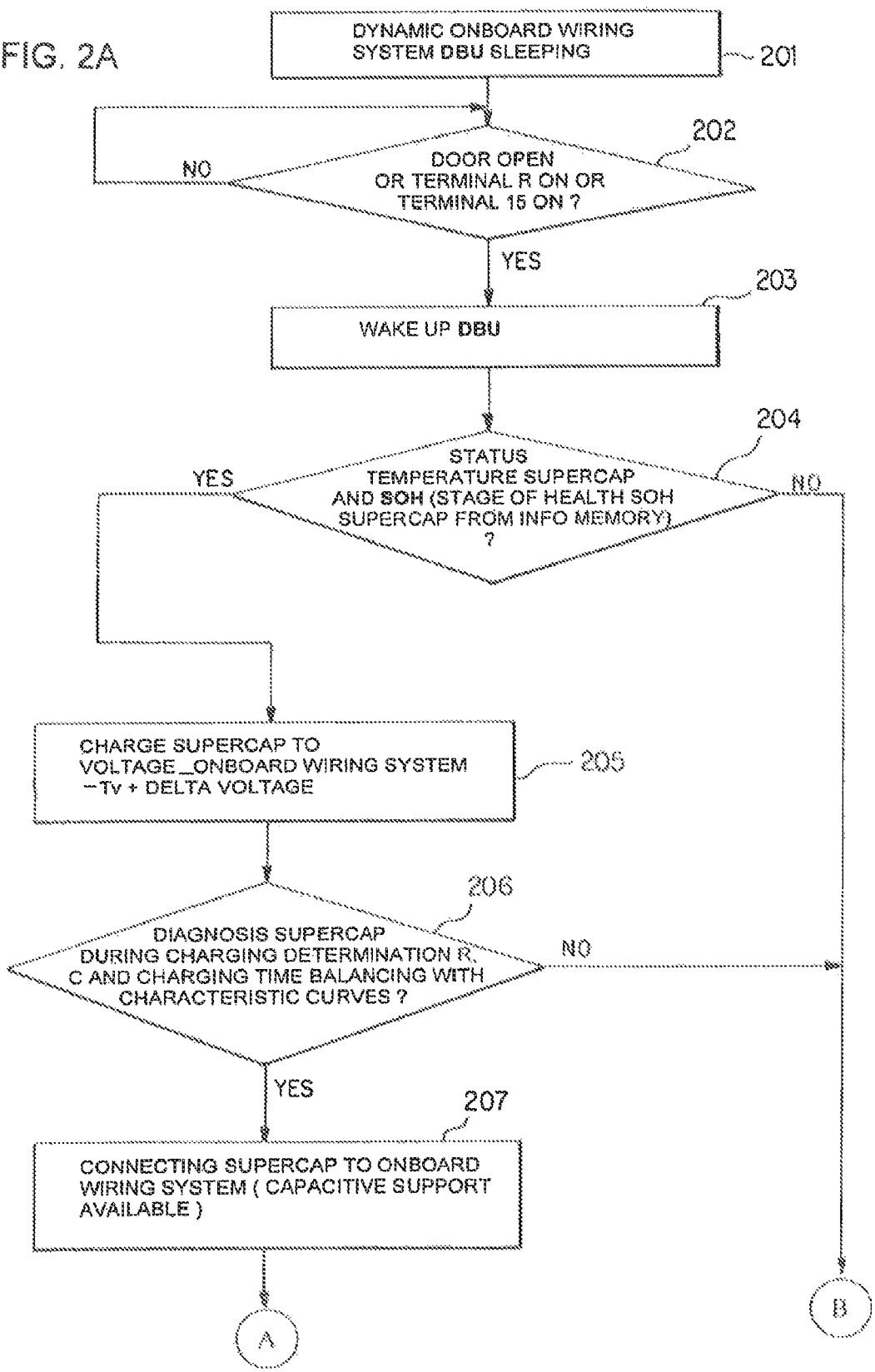

SYSTEM AND METHOD FOR SUPPLYING VOLTAGE TO ELECTRICAL LOADS OF A MOTOR VEHICLE BY USING A SUPERCAP

CROSS-REFERENCE TO RELATED APPLICATIONS

This application is a continuation of PCT International Application No. PCT/EP2007/006692, filed Jul. 28, 2007, which claims priority under 35 U.S.C. §119 to German Patent Application No. DE 10 2006 036 424.4, filed Aug. 4, 2006, the entire disclosures of which are herein expressly incorporated by reference.

This application contains subject matter related to U.S. application Ser. No. 12/364,794, entitled "System for Supplying Voltage to Electrical Loads of a Motor Vehicle," filed on even date herewith.

BACKGROUND AND SUMMARY OF THE INVENTION

The invention relates to a system and method for supplying voltage to electrical loads in the onboard electrical system of a motor vehicle.

In the case of known systems, the generator required for generating the voltage consumes a considerable amount of power, which has to be made available by the engine of the motor vehicle.

It is an object of the present invention to reduce the power to be provided by the motor vehicle engine for supplying the onboard electrical system of the motor vehicle with sufficient electric energy.

This object is achieved by a system and method for supplying the voltage to electrical loads in the onboard electrical system of a motor vehicle. The onboard electrical system includes at least two onboard electrical system regions. The first onboard electrical system region has an electric generator, a vehicle battery, as well as one or more first electrical loads. The second onboard electrical system region has a double-layer capacitor or a so-called supercap and one or more second electrical loads. Between the two onboard electrical system regions, a blocking device is provided, particularly a semiconductor diode or a power switch, which permits a current flow from the first onboard electrical system region into the second electrical system region and largely prevents a reverse current flow from the second onboard electrical system region into the first onboard electrical system region. The output voltage of the electric generator is raised and the supercap is charged when there is a falling below a first threshold value of the electric voltage in the second onboard electrical system region. Advantageous embodiments of the invention are described herein.

According to the invention, the electrical loads in the onboard electrical system of a motor vehicle are divided into a group of at least two types of electrical loads. The first group of electrical (non-sensitive) loads will also operate reliably when there are relatively wide voltage fluctuations and/or when the voltage is relatively low; for example, when, in the case of a 12 volt onboard electrical system, the voltage falls below 10 volts and/or fluctuates between approximately 9 and 16 volts.

In contrast, the second group of electrical (sensitive) loads will operate reliably only when there are relatively slight voltage fluctuations about the nominal voltage; for example, when, in the case of a 12 volt onboard electrical system, the voltage fluctuates only between approximately 11 and 13 volts. According to the invention, the onboard electrical system is divided into at least two electrical system regions; the non-sensitive electrical loads are arranged in the first electrical system region, and the sensitive electrical loads are arranged in the second electrical system region.

A current flow from the second onboard electrical system region into the first onboard electrical system region, according to the invention, is largely prevented by a blocking device or circuit, preferably a semiconductor diode arranged between the first and the second electrical system region. In the first onboard electrical system region, the electric generator and a vehicle battery are arranged in parallel to the first electrical loads, and in the second onboard electrical system region, an energy accumulator, a battery or a capacitor, preferably a double-layer capacitor or a so-called supercap, is arranged in parallel to the second electrical loads. During operation of the motor vehicle, the double-layer capacitor is regularly charged to a voltage which keeps the sensitive second electrical loads ready to operate while it discharges.

During the phases in which the double-layer capacitor does not have to be charged, the voltage of the generator is reduced to such an extent that the operational readiness of the first electrical loads (still) exists (see DE 2006 002 985). In this case, the voltage at the double-layer capacitor is higher than at the first (non-sensitive) loads, and the blocking device or diode prevents the discharge of the double-layer capacitor by way of the loads of the first onboard electrical system region. Inversely, the blocking device permits an electric current flow from the electric generator by way of the blocking device or diode into the second onboard electrical system region when the output voltage of the generator is raised in order to charge the double-layer capacitor.

The monitoring of the charge condition or of the output voltage of the double-layer capacitor takes place by way of a charge control device or a control/power unit which controls the generator such that, when the capacitor voltage falls below a threshold voltage, the generator increases the voltage for charging and subsequently reduces it again.

In contrast to the known state of the art, the generator can be controlled such that, during operation of the motor vehicle, it predominantly provides only a lower voltage for operating the non-sensitive loads. In the case of the known state of the art, it was, however, necessary to lastingly raise the voltage to such an extent that even the sensitive loads always had a sufficient operating voltage available.

Thus, by means of the solution according to the invention, the power consumption of the generator can be reduced for long periods of time and the fuel consumption and the CO2 emission of the motor vehicle can thereby clearly be reduced.

In a particularly advantageous embodiment of the invention, it is provided that precharging and/or coupling or separating of the supercap to the onboard electrical system or from the onboard electrical system takes place by a separate control/power unit. The control/power unit preferably also carries out the diagnosis of the supercap, particularly a capacitance and/or resistance determination, during the precharging operation. As a result of this measure, the supercap can be smoothly integrated into the onboard electrical system of a vehicle.

In a further development of the invention, it is provided that, during precharging or charging of the supercap to the onboard electrical system voltage of the second electrical system region, the temperature of the supercap is measured and is compared with a maximal value. As an alternative or in addition, a fault memory assigned to the supercap is read out, preferably in the control/power unit.

According to the invention, the fault memory preferably has a fault input if, in the past, a comparison of the capacitance (C) values present at the time and/or of the resistance (R) values of the supercap with stored temperature-dependent or charging-current-dependent characteristic values of the supercap pointed to the presence of a fault at the supercap. On the basis of these diagnoses, disturbances of the onboard electrical system as a result of a faulty supercap can be avoided.

In the case of a preferred further development of the system according to the invention, it is provided that, when the supercap falls below a maximal temperature value and the fault input is absent, the supercap is charged to the actual voltage of the second onboard electrical system region or to largely the actual voltage of the second onboard electrical system region, before the supercap is electrically connected with the second onboard electrical system region. The supercap subsequently stabilizes the voltage in the second onboard electrical system region. This measures allows a careful coupling of the supercap to the electrical system of the vehicle.

As a further development of the invention, it is provided that, when the terminal R and/or the terminal 15 are currentless and/or the doors are locked for longer than a predetermined time period, the supercap is discharged to approximately 9 volts by way of a feed back into the onboard electrical system, and is then electrically uncoupled from the onboard electrical system. As a result, a careful uncoupling of the supercap from the onboard electrical system is achieved, and the electrical system is relieved because of the otherwise high quiescent current requirement of the supercap.

In addition, by way of the above-mentioned measures, the charging operation is optimized, particularly with respect to a further reduction of the $CO_2$ emission.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
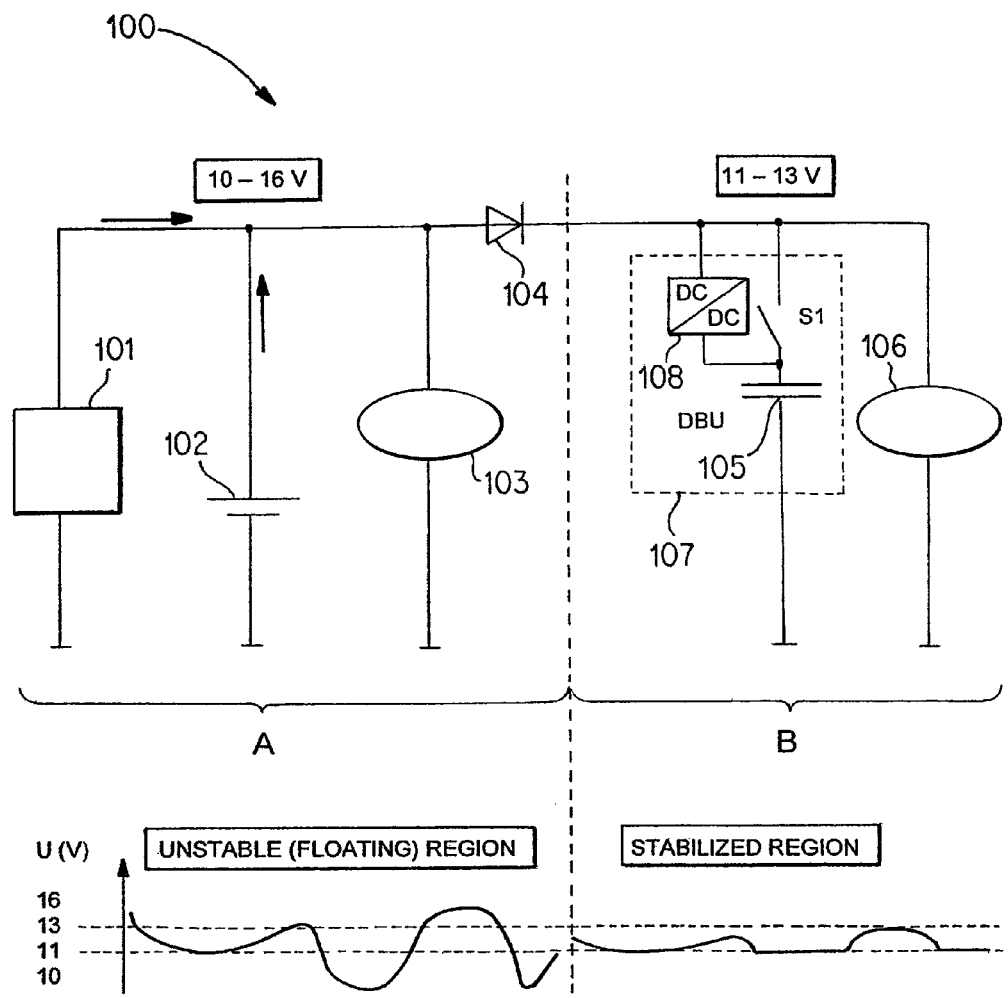
FIG. 1 is a schematic diagram of an onboard electrical system including two onboard electrical system regions, which are electrically connected with one another by way of a diode, as well as a graphical representation of voltage fluctuations over time.

The system according to the invention or the onboard electrical system 100 according to the invention for supplying voltage to electrical loads 103 consists of two onboard electrical system regions A and B. The first onboard electrical system region A has an electric generator 101, a vehicle battery 102 and one or more first electrical loads 103. The second onboard electrical system region B has an energy accumulator in the form of a capacitor or supercap 105 and one or more second electrical loads 106.

A control/power unit 107 is provided between the positive pole of the supercap and the second onboard electrical system region B. This control/power unit 107 controls the diagnosis and the precharging of the supercap, as well as the coupling and the uncoupling of the supercap to the second electrical system region and from the second onboard electrical system region, respectively. The method of operation of the control/power unit 107 will be described in detail in the following in connection with FIG. 2.

Between the two onboard electrical system regions A and B, a blocking device 104 is provided in the form of a semiconductor diode, which permits current to flow from the first onboard electrical system region A into the second onboard electrical system regions B and largely prevents a reverse current flow from the second onboard electrical system region B into the first onboard electrical system region A.

The output voltage of the electric generator 101 is raised and the energy accumulator or capacitor 105 is charged when a first threshold value of the electric voltage in the second onboard electrical system region B is undershot.

For their operation, the first electrical loads 103 require an operating voltage which is in a first voltage range of from 10 to 16 volts; i.e., they are so-called "non-sensitive" loads. For their operation, the second electrical loads 106 require an operating voltage which is within a second narrower, voltage range of from 11 to 13 volts; i.e., they are so-called "sensitive" loads.

As schematically illustrated in FIG. 1 by the graph "Voltage as a Function of the Time", the first onboard electrical system region A is characterized by relatively high voltage fluctuations between approximately 10 and 16 volts (unstable or fluctuating range). In contrast, the second onboard electrical system region B is characterized by relatively low voltage fluctuations between 11 and 13 volts (stabilized range).

Figure 2B:
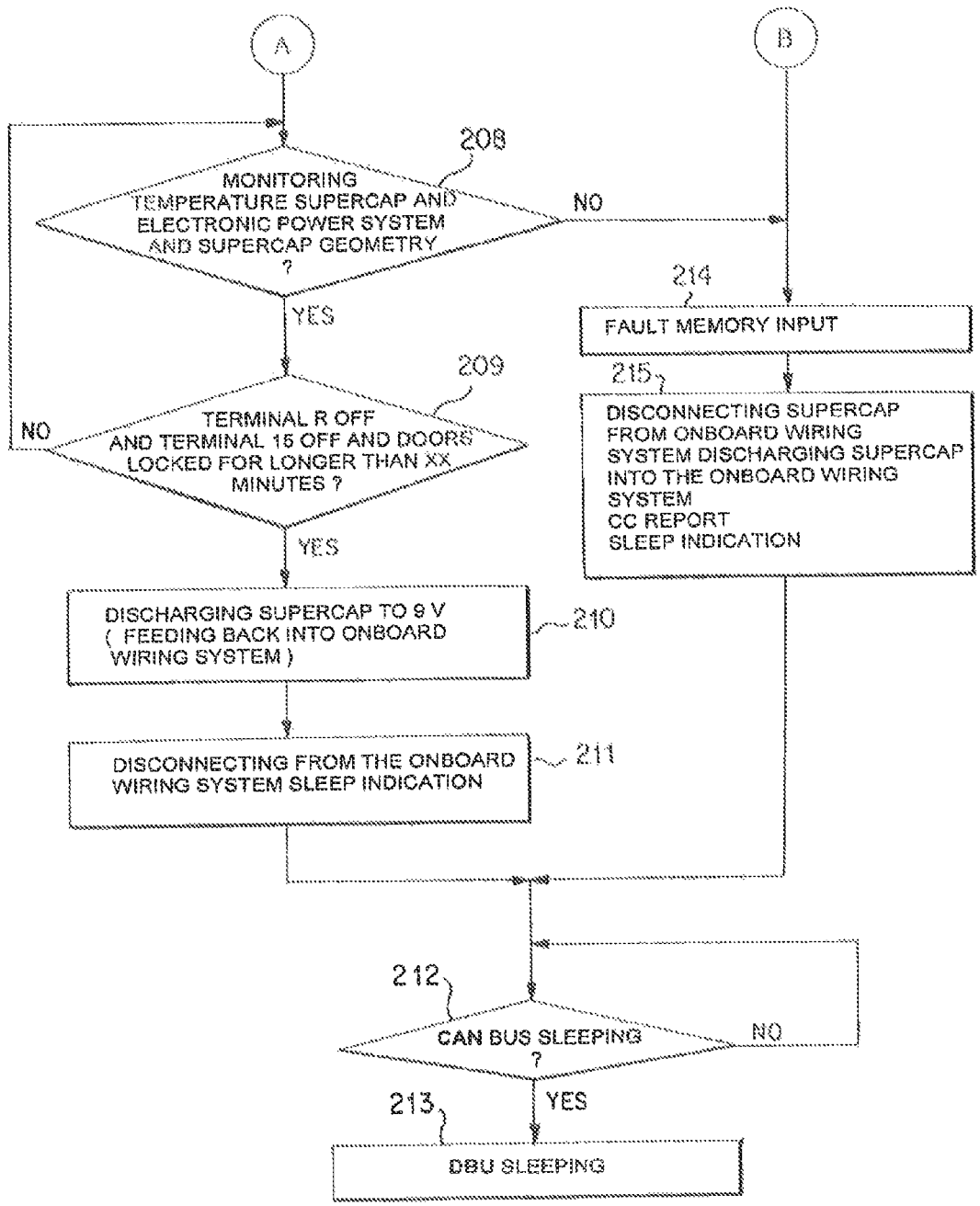
FIG. 2 is a flow chart describing, in particular, the precharging, the coupling, and the uncoupling of the supercap to and from the onboard electrical system of the vehicle.

FIG. 2 is a flow chart 200 describing, in particular, the precharging, the coupling and the uncoupling of the supercap to and from the onboard electrical system of the vehicle. The flow chart process is preferably carried out by the control/power unit 107 which, for this purpose, advantageously has a programmable microprocessor and a corresponding program control or software. In a first condition 201, the control/power unit 107 or DBU, i.e., the Dynamic Onboard Electrical System Support is in a rest condition, i.e., inoperative, and the supercap 105 is not electrically coupled with the second onboard electrical system region B (switch S1 is open).

In step 202, a check takes place as to whether a door of the concerned vehicle is open and/or the terminals R and/or 15, known per se, are switched on or carrying a voltage. If the result of the check is positive or OK, the control/power unit 107 is "woken up" or is changed to a condition in which it is ready to operate (Condition 203).

The supercap is charged by way of the DC converter 108. If the result of the check is negative or NOK, the check is repeated.

After "waking-up" the control/power unit 107, the actual temperature of the supercap is determined in step 204, and is compared with a maximal temperature value. Furthermore, it is checked whether a fault memory input is present in the control/power unit 107, which indicates that, in the past, the supercap was in a condition that points to a fault of the supercap.

If the result of the check in step 204 is negative (OK status), the supercap will be charged or precharged in step 205 to the onboard electrical system voltage of the first electrical system region A, preferably reduced by 1 volt. During the charging or precharging operation, the resistance R, the capacitance C and the charging time t of the supercap or capacitor are determined and compared with reference values (step 206). If the result of this comparison is positive (OK status), i.e., the supercap exhibits an intact behavior, after the conclusion of the precharging operation, in step 207, the supercap is connected with the onboard electrical system and stabilizes the voltage of the second onboard electrical system region (B).

During the coupling of the supercap 105, i.e., during its stabilizing operation, it is continuously monitored (corresponding to step 208) whether the temperature of the supercap and/or of the electronic power system of the control/power unit is below the maximally permissible operating temperature, and whether the supercap symmetry is observed. With respect to the symmetry, it is checked whether the polarization of the individual supercap cells of the supercap module is within predetermined limits. In the case of supercaps with organic electrolytes, that is preferably between limits of 2.3 and 3.0 volt. If the results of the monitoring are positive (OK condition), it is continuously checked in step 209 whether a door of the vehicle has been locked for a predetermined time period and/or the terminals R and/or 15, known per se, have been switched-off or are currentless.

If the result of the check is positive or OK, the supercap is discharged to 9 volts in step 210, wherein excess charge is fed back into the onboard electrical system and the generator is thereby temporarily relieved.

After the conclusion of the (partial) discharge operation of the supercap, the supercap is disconnected from the onboard electrical system in step 211, and the voltage-stabilizing effect of the supercap on the voltage in the second onboard electrical system region B no longer exists.

In the subsequent step 212, it is checked whether the CAN of the vehicle is inactive. If this is so, the control/power unit 107 or DBU is changed to a sleeping mode (Condition 213).

If the result of the monitoring in step 204 was negative (NOK), a fault memory input in the fault memory of the control/power unit 107 takes place in step 214, and the supercap 105 is disconnected from the onboard electrical system; the supercap is discharged; and a corresponding report takes place to the driver, possibly with the additional information that the supercap was deactivated or is in a rest mode.

The process proceeds A passing through steps 214 and 215 also when the result of step 206 and/or step 208 is negative (NOK). Step 215 will then be followed by steps 212 and 213.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for supplying voltage to electrical loads in an onboard electrical system of a motor vehicle, the system comprising:
    a first onboard electrical system region of the onboard electrical system, the first region having an electric generator, a vehicle battery, and one or more first electrical loads;
    a second onboard electrical system region of the onboard electrical system, the second region including a supercap and one or more second electrical loads;
    a current blocking device operatively configured between the first and second regions, the current blocking device permitting a current flow from the first region into the second region and largely preventing a reverse current flow from the second region into the first region; and
    a separate control/power unit for controlling at least one of precharging and coupling/decoupling of the supercap with respect to the onboard electrical system;
    wherein an output voltage of the electric generator is increased and the supercap is charged when a first threshold value of an electrical voltage in the second region is undershot,
    wherein the separate control/power unit is operatively configured to diagnose the supercap by performing a capacitance and/or resistance determination during the precharging of the supercap.

2. The system according to claim 1, wherein the current blocking device is one of a semiconductor diode and a power switch.

3. A system for supplying voltage to electrical loads in an onboard electrical system of a motor vehicle, the system comprising:
    a first onboard electrical system region of the onboard electrical system, the first region having an electric generator, a vehicle battery, and one or more first electrical loads;
    a second onboard electrical system region of the onboard electrical system, the second region including a supercap and one or more second electrical loads; and
    a current blocking device operatively configured between the first and second regions, the current blocking device permitting a current flow from the first region into the second region and largely preventing a reverse current flow from the second region into the first region;
    wherein an output voltage of the electric generator is increased and the supercap is charged when a first threshold value of an electrical voltage in the second region is undershot,
    wherein during precharging or charging of the supercap to the onboard electrical system voltage of the second region, at least one of the following is performed:
    a.) a temperature of the supercap is measured and compared with a maximal value;
    b.) a fault memory assigned to the supercap is read-out, the fault memory having a fault input if, in the past, a comparison of capacitance values and/or resistance values of the supercap with stored temperature-dependent or charging-current-dependent characteristic values of the supercap indicates a fault present at the supercap;
    wherein, when the supercap falls below the maximal temperature value and the fault input is absent, the supercap is charged largely to an actual voltage of the second region before the supercap is electrically coupled with the second region and stabilizes the voltage in the second region, a fault input occurring when the capacitance and/or resistance value of the supercap indicates the fault at the supercap.

4. The system according to claim 3, further comprising:
    a separate control/power unit for controlling at least one of precharging and coupling/decoupling of the supercap with respect to the onboard electrical system.

5. A system for supplying voltage to electrical loads in an onboard electrical system of a motor vehicle, the system comprising:
    a first onboard electrical system region of the onboard electrical system, the first region having an electric generator, a vehicle battery, and one or more first electrical loads;
    a second onboard electrical system region of the onboard electrical system, the second region including a supercap and one or more second electrical loads; and
    a current blocking device operatively configured between the first and second regions, the current blocking device permitting a current flow from the first region into the second region and largely preventing a reverse current flow from the second region into the first region;

wherein an output voltage of the electric generator is increased and the supercap is charged when a first threshold value of an electrical voltage in the second region is undershot, wherein, when at least one of a terminal R and a terminal 15 are currentless and/or doors of the motor vehicle are locked in excess of a predetermined time period, the supercap is discharged to a voltage below the onboard electrical system voltage of the first region and/or of the second region.

6. The system according to claim 5, wherein the supercap is discharged to a voltage below approximately 6-9 volts via a feedback into the onboard electrical system, the supercap then being electrically uncoupled from the onboard electrical system.

7. A method for supplying voltage to electrical loads in an onboard electrical system of a motor vehicle having first and second onboard electrical system regions, the first region including an electric generator, a battery, and one or more first electrical loads and the second region including a supercap and one or more second electrical loads, the method comprising the acts of:

determining when a first threshold value of an electric voltage in the second onboard electrical system region is undershot;

increasing an output voltage of the electric generator in the first onboard electrical system region to charge the supercap when the first threshold value is undershot;

controlling the charging of the supercap and/or an electrical coupling/uncoupling of the supercap to the onboard electrical system via a separate control unit; and diagnosing a capacitance and/or resistance of the supercap during the charging via the separate control unit.

8. The method according to claim 7, further comprising the acts of:

measuring a temperature of the supercap and comparing said measured temperature with a maximal value during charging of the supercap to the electric voltage of the second region; and reading-out a fault memory assigned to the supercap, the fault memory having a fault input if a prior comparison of the capacitance and/or resistance values of the supercap with stored temperature-dependent or charging-current-dependent characteristic values of the supercap indicates a fault present at the supercap.

9. The method according to claim 8, wherein, when the supercap falls below the maximum temperature value and the fault input read out of the fault memory is absent, the supercap is charged largely to the actual voltage of the second region before being electrical coupled with the second region in order to stabilize the voltage in the second region.

* * * * *